United States Patent

Habenicht et al.

[11] Patent Number: 6,004,199
[45] Date of Patent: Dec. 21, 1999

[54] APPARATUS AND METHOD FOR SEPARATING LEGS FROM POULTRY CARCASSES

[75] Inventors: Frank Habenicht, Sereetz; Siegbert Wruck, Stralsund; Klaus Ziebell, Lübeck, all of Germany

[73] Assignee: Nordischer Maschinenbau Rud. Baader GmbH & Co. KG, Lübeck, Germany

[21] Appl. No.: 09/010,328

[22] Filed: Jan. 21, 1998

[30] Foreign Application Priority Data

Jan. 21, 1997 [EP] European Pat. Off. .............. 97100859
Mar. 8, 1997 [EP] European Pat. Off. .............. 97103920

[51] Int. Cl.⁶ .................................................. A22C 18/00
[52] U.S. Cl. ............................................ 452/166; 452/167
[58] Field of Search .................................... 452/166, 167, 452/170

[56] References Cited

U.S. PATENT DOCUMENTS

| 4,385,421 | 5/1983 | Martin . | |
|---|---|---|---|
| 4,639,975 | 2/1987 | Van Der Eerden | 452/167 |
| 5,015,213 | 5/1991 | Hazenbroek . | |
| 5,019,013 | 5/1991 | Hazenbroek | 452/167 |
| 5,035,673 | 7/1991 | Hazenbroek | 452/167 |
| 5,147,240 | 9/1992 | Hazenbroek . | |
| 5,176,563 | 1/1993 | van den Nieuwelaar . | |
| 5,188,559 | 2/1993 | Hazenbroek . | |
| 5,490,812 | 2/1996 | Schaarschmidt . | |
| 5,494,479 | 2/1996 | Lindert . | |

FOREIGN PATENT DOCUMENTS

| 369544 | 5/1990 | European Pat. Off. . |
| 459580 | 12/1991 | European Pat. Off. . |
| 8303683 | 5/1985 | Netherlands . |

*Primary Examiner*—Willis Little
*Attorney, Agent, or Firm*—Knobbe, Martens, Olson & Bear, LLP

[57] ABSTRACT

Disclosed is an apparatus for separating legs from poultry carcasses having a saddle-shaped carcass section with a pelvis, a lower portion of a vertebral column, and hip joints connecting the legs to the pelvis. The apparatus comprises a main conveyor defining a conveyance path and having shackles configured to hold the poultry carcasses by the legs to convey the carcasses along the path with the vertebral column in longitudinal direction. A guide member runs along the conveyance path between the main conveyor and the vertebral column and is configured to engage an inside contour of the pelvis and both legs along a substantial length of the legs. A support conveyor is positioned below the main conveyor and has a surface to engage the carcasses and move them along the conveyance path. A set of cutting devices is located above the support conveyor and on opposing sides of the conveyance path and orientated along the path of the hip joint to cut the connective tissue in an area of the bend of each hip joint and to cut a leg tendon adjacent each hip joint. Restraining means which are also comprised in the apparatus engage the pelvis for restraining movement of the pelvis relative to the first conveyor to separate the legs from the pelvis at the hip joint.

20 Claims, 2 Drawing Sheets

APPARATUS AND METHOD FOR SEPARATING LEGS FROM POULTRY CARCASSES

FIELD OF THE INVENTION

The present invention relates to an apparatus for processing carcasses, and more particularly to an apparatus and a method for separating legs from poultry carcasses.

BACKGROUND OF THE INVENTION

The invention is based on an apparatus to separate the legs of poultry carcasses, predominantly present in the form of so-called "back halves"—that is, a caracas portion in which the breast portion (front half) is separated by a transverse incision conducted between the upper and lower extremities, leaving the so-called "oyster meat" on the back half, and consists of a saddle-shaped carcass section with the pelvis, the lower portion of the vertebral column, the hip joints with the legs, and the tail portion, comprising the main conveyor, which determines the conveyance path, with holders to hold the poultry carcasses by the legs in a suspended arrangement and the conveyance of the carcasses with the vertebral column in the longitudinal direction, processing devices disposed along the conveyance path to detach and to separate the legs in the area of the hip joints, and devices correlated with the processing devices for guiding and for the supporting conveyance of the back halves.

Such an apparatus is known, for example, from U.S. Pat. No. 5,188,559. In this apparatus, a processing tool is used which has the task of separating the legs from the poultry back halves, comprising the legs and the pelvis, in the area of the hip joints. To this end, the back halves are moved forward by a conveyor with suspended shackles on the foot joints, suspended along a horizontal conveyance path, wherein a preliminary separation from the inside of the pelvis takes place in the area of the hip joints. Subsequently, the pelvis portion is turned by rotating the hip joints 180° and by means of a conveyance disk acting on the inside of the pelvis, conducted out of the conveyance path, wherein a separation of the legs from the pelvis is carried out by tearing.

With such devices, the important thing is that the meat yield be as high as possible, which for the processing under discussion means that care must be taken that as little mat as possible is lost with the separated pelvis. An inevitable prerequisite for this is that the "oyster meat" reliably remain on the leg portions obtained. At ale same time, it should also be ensured that the joint balls not be damaged; a harming of the balls can produce, among other things, the undesired effect that bone marrow leaks from the upper thigh bone and is spread of the product. Finally, the leg portions obtained should have an appropriate appearance—that is, have as smooth as possible a contour and surface in the separation area There is therefore a need to provide a comparatively simple apparatus for separating legs from poultry backs, which ensures an optimal meat yield and produces a qualitatively optimized product.

SUMMARY OF THE INVENTION

The is attained—at least in its essential portions—with an apparatus of the type described in the beginning in that the processing devices to detach the legs in the area of the hip joints have blades, disposed on both sides of the conveyance path, to separate the connective tissue in the area of the bend of the hip joint and the main leg tendon, that the devices for guidance comprise guide elements for the back halves, which run along the conveyance path and essentially parallel to it, with action in the area of the inside contour of the pelvis and the legs, that the devices for the supporting conveyance of the back halves exhibit an auxiliary conveyor, and that the processing devices to separate the legs are configured as restraining devices acting on the pelvis.

The structure indicated makes possible a separation oriented to theoretical breakage sites, which are acted on in such a manner that in connection with the separation movement produced by restraining the pelvis, a high yield is attained with a comparatively smooth separation area, with great reliability.

To attain the result in accordance with the need, it is appropriate to further weaken the structures connecting the legs with the pelvis. This is done advantageously by separating the connective tissue in the area of the bend of the hip joint and by separating the main leg tendon. Preferably, the former can be attained by a pair of blades which are disposed in a mirror-image manner with respect to the conveyance path and which extend with their incisions from the inside of the pelvis into the path of the hip joints and the latter, by a pair of blades disposed in a mirror-image manner with respect to the conveyance path and upstream from the first pair, which, with their incisions, cross the path of the hip joints from the inside of the pelvis.

A decisive prerequisite for this is a precise guidance of the back halves. This can be attained by guide elements, which comprise an essentially parallel, central guide track extending through the entire processing area and a pair of guides, disposed in a mirror-image manner with respect to the conveyance path.

To avoid a deflection of the back halves due to the effective cutting force, the so-called auxiliary conveyor can be appropriately provided, which extends through the area of the processing device and is provided with devices for moving the back halves under support of the outside contour of the pelvis. The auxiliary conveyor can thereby be preferably configured as an endless double chain conveyor with a carrying run, which is conducted opposite the central guide track with allowance for a gap and is driven in a continuous synchronous manner with respect to the main conveyor.

The actual separation of the legs from the pelvis is finally undertaken in a particularly advantageous manner by the restraining device, which can be configured in a first embodiment as a braking element, which can move along the conveyance path, with at least one catch, which projects into the path and against the central guide track to guide the pelvis. An advantageous refinement of the braking element can consist in that it is designed as a rocking arm which can be swiveled around a swivel axis arranged below the conveyance path and transverse to it, against the force of a spring in the direction of movement of the main conveyor, wherein the rocking arm can be provided with a supporting surface concentric to the swivel axis for the purpose of supporting the pelvis during the separation process. In an alternate embodiment, the restraining device can comprise an auxiliary conveyor, designed as an endless chain conveyor with catches, whose partition is smaller than that of the holders of the main conveyor, wherein the auxiliary conveyor has a drive which imparts a speed that with respect to that of the main conveyor is in a ratio which corresponds to that of the degree of partition of the catches and the degree of partition of the holders.

An aspect of the invention involves an apparatus for separating legs from poultry carcasses having a saddle-shaped carcass section with a pelvis, a lower portion of a vertebral column, and hip joints connecting the legs to the pelvis. The apparatus comprises a main conveyor defining a conveyance path and having shackles configured to hold the poultry carcasses by the legs in a suspended arrangement and to convey the carcasses along the path with the vertebral column in longitudinal direction. The apparatus further comprises a guide member and a support conveyor. The guide member runs along the conveyance path between the main conveyor and the vertebral column and is configured to engage an inside contour of the pelvis and both legs along a substantial length of the legs. The support conveyor is positioned below the main conveyor and has a surface to engage the carcasses and move them along the conveyance path. A set of cutting devices is located above the support conveyor and on opposing sides of the conveyance path and orientated along the path of the hip joint to cut the connective tissue in an area of the bend of each hip joint and to cut a leg tendon adjacent each hip joint. Restraining means which are also comprised in the apparatus engage the pelvis for restraining movement of the pelvis relative to the first conveyor to separate the legs from the pelvis at the hip joint.

A further aspect of the invention involves an apparatus for separating legs from poultry carcasses having a saddle-shaped carcass section with a pelvis, a lower portion of a vertebral column, and hip joints with the legs. The apparatus comprises a main conveyor defining a conveyance path and processing devices disposed along opposing sides of the conveyance path to engage each leg from a direction within the pelvis to cut the connective tissue in an area of the bend of the hip joint to cut the connective tissue to the bone and to cut the main leg tendon.

A still further aspect of the invention involves a method for separating legs from a poultry carcass comprising a saddle-shaped body portion having a pelvis and hip joints with legs. The method comprises the steps of holding the legs and moving them along a conveyance path; conveying the carcasses along the same conveyance path; cutting connective tissues and leg tendons in the legs in an area of a bend of the hip joints and main leg tendons; and restraining movement of the pelvis along the path relative to the movement of the legs to separate the legs and the pelvis.

BRIEF DESCRIPTION OF THE DRAWINGS

The above-mentioned and other features as well as advantages of the invention will now be described with reference to the drawings of preferred embodiments of the apparatus. The illustrated embodiments are intended to illustrate, but not to limit the invention. In the drawings. In a simplified representation, the drawings contain the following figures.

DETAILED DESCRIPTION OF THE PREFERRED EMBODIMENT

Figure 1:
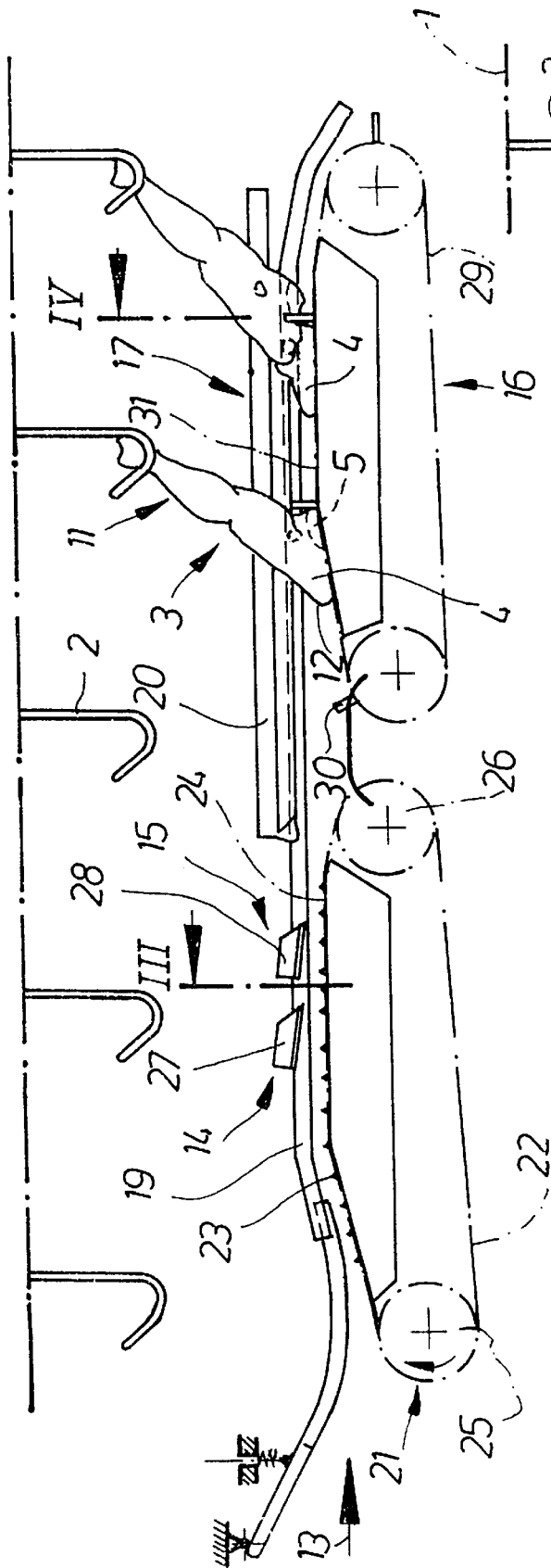
FIG. 1 is a side view of the apparatus.

The apparatus in accordance with the invention is installed in a nondepicted machine frame of a cut-up line, in which a main conveyor 1, which is only hinted at and runs in a horizontal plane, is supported. This is equipped with a large number of shackles 2, arrange at uniform intervals with respect to one another, to support the poultry carcass to be processed by its legs. The carcass section 3 handled here is the so-called "back half"—that is, a lower portion of the poultry carcass, in which the breast portion ("front half") is separated by a transverse incision conducted between the upper and lower extremities. This portion comprises the pelvis 4 and the lower portion of the vertebral column 6, the hip joints 7, consisting of the joint sockets 8 and the joint balls 9, the upper thighs 10, the legs 11, and the tail portion 12.

The conveyer movement of the main conveyor 1 takes place along a conveyance path 13, on which various processing devices are disposed. They comprise a cutting tool 14 to separate the connective tissue in the area of the bend of the hip joint, a separating tool 15 to separate the main leg tendon, and restraining device 16 to separate the legs 11 in the area of the hip joints 7.

The tools 14, 15 have working elements affixed, in pairs and in a symmetric manner to the conveyance path 13, wherein the working areas of the tools are traversed by devices 17 disposed throughout to guide the back halves.

Figure 4:
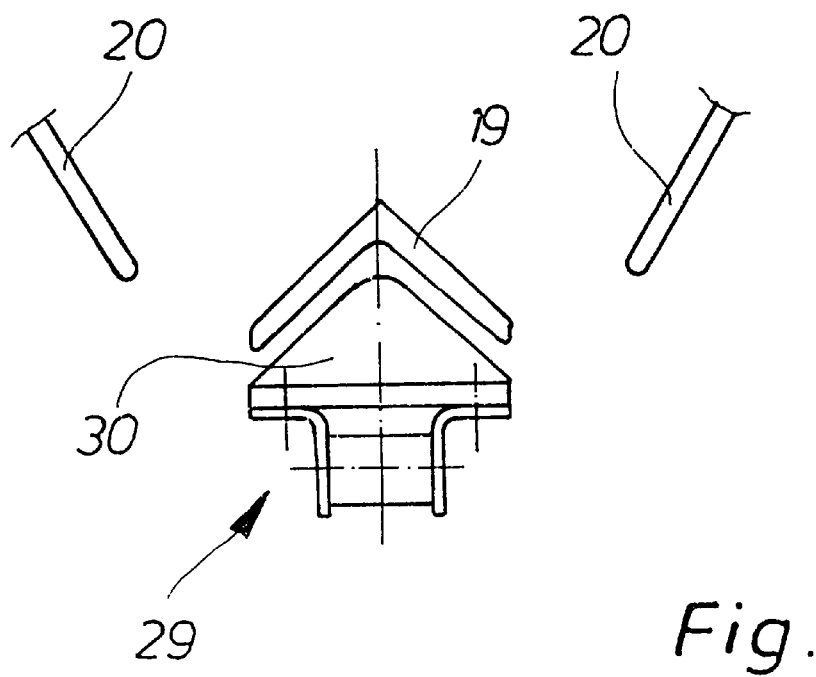
FIG. 4 is a cross-section through the apparatus according to FIG. 1, along the intersecting line IV.

The guide devices 17 consist of a guide track 19 affixed longitudinally and parallel to the conveyance path 13, with a roof-like cross-section, and of the guide elements 20, supporting the back halves on the inside of the legs and in the area of the hip joints 7 (see FIGS. 1 and 4). The guide elements 20 are configured to engage an inside contour of the pelvis 4 and both legs 11 along a substantial length of the legs 11, advantageously along more than half of the length of the legs 11, and preferably along more than three quarters of that length. An auxiliary conveyor 21 in the form of an endless double chain conveyor 22, equipped with prongs 23, is situated in the working area of the tools 14, 15; the auxiliary conveyor is supported in the machine frame in such a way that its circulating plane lies in the vertical plane of the conveyance path 13 and its carrying run 24 is opposite the guide track 19 at a parallel distance and opens wedge-shaped in the entry area against the direction of the conveyor. The corresponding guidance is carried out by deflecting wheels 25 and 26 (FIG. 1).

The tools 14 and 15 have pairs of blades 27 and 28 situated along the conveyance path 13 and in a mirror image manner with respect to the two sides of the guide track, behind one another; they re provided with cutting edges pointing downwards and extending along the conveyance path 13. The blades 27 are positioned in the path of the bend of the hip joint, wherein their cutting edges approach the plane of the carrying run 24 of the auxiliary conveyor 21 at an acute angle from the inside of the pelvis 4. The blades 28 are positioned, on the other hand, so that their cutting edges are also effective form the inside of the pelvis 4, but cross the path of the hip joints 7. The blades 28 can be stored, suspends, in a nondepicted manner, so that they have a limited swiveling ability transverse to the conveyance path 13. The restraining devices 16 to separate the legs 11 from the pelvis 4 follow the auxiliary conveyor 21 and comprise another auxiliary conveyor 29, which is configured as an endless chain conveyor and equipped with catches, whose partition is smaller than that of the shackles 2 of the main conveyor 1. The auxiliary conveyor 29 has a drive which imparts a speed to it which with respect to that of the main conveyor 1 is in a ratio which corresponds to that of the degree of partition of the shackles 2. The catches 30 are conducted in the area of the carrying run 31 of the conveyor in such a manner that they dip into the roof-like profile of the guide track 19 and almost fill it (FIG. 4).

In accordance with the embodiment according to FIG. 2, the auxiliary conveyor 29 is replaced by a braking element 33, which can swivel along the conveyance path around a swivel axis 32 situated below the conveyance path 13. The braking element 33 is designed as a rocking arm 34, which can swivel between stops 35 and 36 against the force of a spring 37 in the direction of movement of the main conveyor 1. the rocking arm 34 has a catch 38, which dips into the profile of the guide track 19 and is equipped with a supporting surface 39 for the pelvis 4, concentric to the swivel axis 32.

Figure 3:
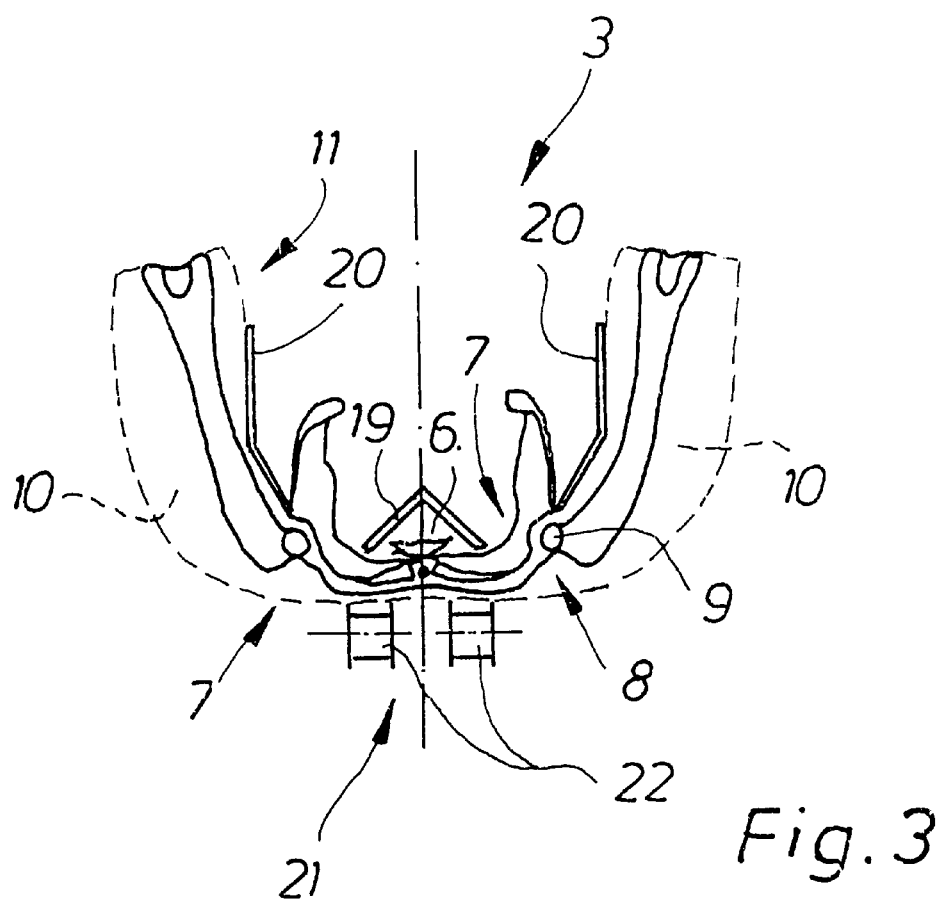
FIG. 3 is a cross-section through the apparatus according to FIG. 1, along the intersecting line III, with a sectional cross-section through the skeleton of the back half.

The mode of action of the apparatus in accordance with the invention is described below, following the course of a back half, whose characteristics are those presented in the beginning and which was produced by an appropriate preliminary processing. The back half suspended by the legs in shackles 2 and conveyed with the tail end 12 following the first aligned, which takes place by moving the pelvis 4 under the guide track 19 and supporting the upper thigh 10 from the inside by nondepicted guide elements which are similar to the guides 20 (FIGS. 1, 3 and 4). The moving along of the back half is accomplished thereby via a conducting track 18, which can be displaced upwards against elastic force. Thus, the back half moves into the area of the auxiliary conveyor 21, which moves synchronously with the main conveyor ;and which pushes the pelvis 4, with support from the outside, against the guide track 19 and conducts it in the blades 27 and 28, which bring about the separation of the connection tissue in the bends of the hip joint down to the hip joint 7 and, subsequently, the separation of the main leg tendon.

In this way, detached in the hip joints, but still hanging together, the back half arrives at the effective area of the restraining agents 16. The pelvis 4 is then grasped in a supporting manner from the outside by the auxiliary conveyor 29 and conveyed at a reduced speed. The result o this is that the next projecting catch 46 grasps the pelvis 4 on its cut area so that an increasing tensile and shearing force is exerted on the remaining connections between the legs 11 and the pelvis 4, until finally the separation is completed. Owing to the described preparation, the oyster meat remains connected with the leg meat.

Figure 2:
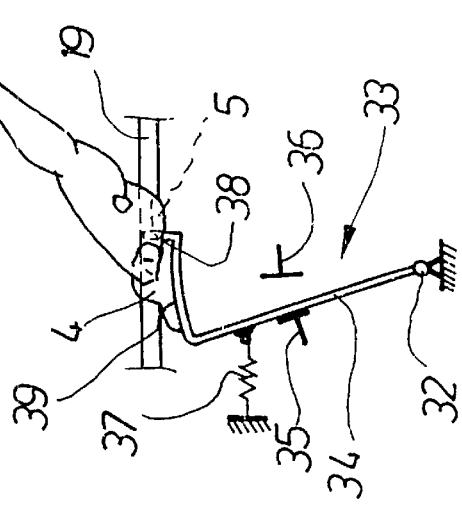
FIG. 2 is a sectional side view of the apparatus according to FIG. 1 in a modified refinement.

The alternate possibility for separating the pelvis 4 and legs 11 by means of the braking element 33 in accordance with FIG. 2 proceeds in such a manner that the pelvis is pulled by its cut area against the catch 38 of the rocking arm 34, which means that the rocking arm is moved along in a delayed manner against the force of the spring 37, with the beginning separation of the connections between the legs find the pelvis, until at the latest after arriving at stop 36, the complete separation is carried out.

The described apparatus makes possible a separation of the legs with high efficiency, reliability and yield.

Although an exemplary embodiment of the invention has been disclosed for purposes of illustration, it will be understood that various changes, modifications and substitutions be incorporated in such embodiment without departing from the spirit of the invention as defined by the claims which follow.

What is claimed is:

1. An apparatus for separating legs from poultry carcasses having a saddle-shaped carcass section with a pelvis, a lower portion of a vertebral column, and hip joints connecting the legs to the pelvis, comprising:

a main conveyor defining a conveyance path and having shackles configured to hold the poultry carcasses by the legs in a suspended arrangement and to convey the carcasses along the path with the vertebral column in longitudinal direction;

a guide member running along the conveyance path between the main conveyor and the vertebral column and configured to engage an inside contour of the pelvis and both legs along a substantial length of the legs;

a support conveyor positioned below the main conveyor and having a surface to engage the carcasses and move them along the conveyance path;

a set of cutting devices located above the support conveyor and on opposing sides of the conveyance path and orientated along the path of the hip joint to cut the connective tissue in an area of the bend of each hip joint and to cut a leg tendon adjacent each hip joint; and restraining means engaging the pelvis for restraining movement of the pelvis relative to the first conveyor to separate the legs from the pelvis at the hip joint.

2. The apparatus according to claim 1, wherein the cutting device comprises a first set of cutting blades having a cutting edge which crosses a path of the hip joint from within the pelvis and is positioned to cut the connective tissue, and wherein the first set of blades is situated downstream from a second set of cutting devices which comprise a set of cutting blades having a cutting edge which crosses a path of the hip joint from within the pelvis and is positioned to cut the leg tendon.

3. The apparatus according to claim 1 wherein the restraining means comprises an auxiliary conveyor below and substantially parallel to the main conveyor, and having a conveyor surface configured to releasably engage and support the carcass during processing, the auxiliary conveyor moving at a rate different from the main conveyor to separate the legs from the hip sockets after the tendon and connective tissue is cut.

4. The apparatus according to claim 1, wherein the restraining device comprises a braking element which can move along the conveyance path with at least one catch which projects into the conveyance path and adjacent to the guide elements to guide and restrain movement of the pelvis relative to the main conveyor to separate the legs from the hip sockets.

5. The apparatus according to claim 1, wherein the restraining device comprises a braking element having a rocking arm mounted to swivel about a swivel axis situated below the conveyance path and transverse to that path, the arm further swiveling against the force of a spring when the arm moves in the direction the maim conveyor is moving.

6. The apparatus according to claim 5, wherein the rocking arm has a supporting surface concentric to the swivel axis and located to support the pelvis.

7. The apparatus according to claim 3, wherein the restraining device comprises a braking element having a rocking arm mounted to swivel about a swivel axis situated below the conveyance path and transverse to that path, the arm further swiveling against the force of a spring when the arm moves in the direction the main conveyor is moving.

8. The apparatus according to claim 1, wherein the main conveyor has a first speed and wherein the restraining devices comprise a second auxiliary conveyor having a drive which imparts a second speed different than the speed of the main conveyor to pull the legs from the pelvis at the hip joints.

9. An apparatus for separating legs from poultry carcasses having a saddle-shaped carcass section with a pelvis, a lower portion of a vertebral column, and hip joints with the legs, comprising:

a main conveyor defining a conveyance path and having holders to hold the poultry carcasses by the legs in a suspended arrangement and to convey the carcasses along the conveyance path with the vertebral column in a longitudinal direction along a length of the path;

processing devices disposed along opposing sides of the conveyance path to engage each leg from a direction within the pelvis to cut the connective tissue in an area of the bend of the hip joint to cut the connective tissue to the bone and to cut the main leg tendon and a guide member running along the conveyance path between the main conveyor and the vertebral column and configured to engage an inside contour of a thigh portion of each leg along a length of each leg sufficient to position the joint between the pelvis and the thigh for cutting.

10. A method for separating legs from a poultry carcass comprising a saddle-shaped body portion having a pelvis and hip joints with legs, comprising the steps of:

holding the legs and moving them along a conveyance path;

conveying the carcasses along the same conveyance path;

cutting connective tissues and leg tendons in the legs in an area of a bend of the hip joints and main leg tendons while supporting an inside of each thigh along a length of the legs to position the hip joints for the cutting step; and restraining movement of the pelvis along the path relative to the movement of the legs to separate the legs and the pelvis.

11. The method according to claim 10, wherein the holding step comprises supporting the inside of the legs along a substantial length of an inside contour of the thigh of each of the legs.

12. The method according to claim 10, wherein the restraining step comprises the step of placing a braking element along the conveyance path with at least one catch projecting into the conveyance path a guide rail placed along the path to guide and restrain movement of the pelvis relative to the main conveyor.

13. The method according to claim 10, wherein the restraining step comprises the step of rotating a rocking arm about a swivel axis situated below the conveyance path and transverse to that path to engage the carcass, and restraining rotation of that arm so the legs are separated from the hip joints before the rocking arm swivels out of contact with the carcass as the carcass moves along the conveyance path.

14. The method according to claim 13, comprising the further step of resiliently urging the rocking arm against the carcass.

15. A method for separating legs from a poultry carcass comprising a saddle-shaped body portion having a pelvis and hip joints with legs, comprising the steps of:

holding the legs and moving them along a conveyance path;

conveying the carcasses along the same conveyance path;

cutting connective tissues and leg tendons in the legs in an area of a bend of the hip joints and main leg tendons; and restraining movement of the pelvis along the path relative to the movement of the legs to separate the legs and the pelvis by placing a braking element along the conveyance path with at least one catch projecting into the conveyance path a guide rail placed along the path to guide and restrain movement of the pelvis relative to the main conveyor.

16. A method for separating legs from a poultry carcass comprising a saddle-shaped body portion having a pelvis and hip joints with legs, comprising the steps of:

holding the legs and moving them along a conveyance path;

conveying the carcasses along the same conveyance path;

cutting connective tissues and leg tendons in the legs in an area of a bend of the hip joints and main leg tendons; and restraining movement of the pelvis along the path relative to the movement of the legs to separate the legs and the pelvis by rotating a rocking arm about a swivel axis situated below the conveyance path and transverse to that path to engage the carcass, and restraining rotation of that arm so the legs are separated from the hip joints before the rocking arm swivels out of contact with the carcass as the carcass moves along the conveyance path.

17. The method according to claim 16, comprising the further step of resiliently urging the rocking arm against the carcass.

18. An apparatus for separating legs from poultry carcasses having a saddle-shaped carcass section with a pelvis, a lower portion of a vertebral column, and hip joints connecting the legs to the pelvis, comprising:

a main conveyor defining a conveyance path and having shackles configured to hold the poultry carcasses by the legs in a suspended arrangement and to convey the carcasses along the path with the vertebral column in longitudinal direction;

a guide member running along the conveyance path between the main conveyor and the vertebral column and configured to engage both legs and guide the legs during cutting;

a support conveyor positioned below the main conveyor and having a surface to engage the carcasses and move them along the conveyance path;

a set of cutting devices located above the support conveyor and on opposing sides of the conveyance path and orientated along the path of the hip joint to cut the connective tissue in an area of the bend of each hip joint and to cut a leg tendon adjacent each hip joint; and a breaking element engaging the pelvis to restrain movement of the pelvis relative to the first conveyor to separate the legs from the pelvis at the hip joint, the breaking element having at least one catch which projects into the conveyance path and adjacent to the guide elements to guide and restrain movement of the pelvis relative to the main conveyor to separate the legs from the hip sockets.

19. The apparatus according to claim 18, wherein the braking element comprises a rocking arm mounted to swivel about a swivel axis situated below the conveyance path and transverse to that path, the arm further swiveling against the force of a spring when the arm moves in the direction the main conveyor is moving.

20. The apparatus according to claim 19, wherein the guide member is configured and located to engage an inside of a thigh of each leg along a length of each thigh.

* * * * *